(12) United States Patent
Sauter et al.

(10) Patent No.: US 11,585,430 B2
(45) Date of Patent: Feb. 21, 2023

(54) CONTROL METHOD AND CONTROL UNIT FOR A VEHICLE DRIVETRAIN

(71) Applicant: ZF Friedrichshafen AG, Friedrichshafen (DE)

(72) Inventors: Michael Sauter, Tettnang (DE); Markus Eisele, Friedrichshafen (DE); Martin Dietrich, Rosengarten (DE); Franz Bitzer, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 272 days.

(21) Appl. No.: 16/874,922

(22) Filed: May 15, 2020

(65) Prior Publication Data

US 2020/0362958 A1    Nov. 19, 2020

(30) Foreign Application Priority Data

May 17, 2019    (DE) .................. 10 2019 207 254.2

(51) Int. Cl.
*B60W 10/08*    (2006.01)
*F16H 57/04*    (2010.01)
(Continued)

(52) U.S. Cl.
CPC ........... *F16H 57/0439* (2013.01); *B60K 5/00* (2013.01); *B60K 17/06* (2013.01); *B60K 23/00* (2013.01);
(Continued)

(58) Field of Classification Search
CPC ................ B60W 10/08; B60W 10/30; B60W 2510/0208; B60W 2510/1005;
(Continued)

(56) References Cited

U.S. PATENT DOCUMENTS

| | | | | |
|---|---|---|---|---|
| 7,421,928 B2* | 9/2008 | Klaus | ...................... | F16H 57/04 475/5 |
| 7,789,794 B2* | 9/2010 | Hong | ................ | B60W 30/1843 318/434 |

(Continued)

FOREIGN PATENT DOCUMENTS

| | | | | |
|---|---|---|---|---|
| CN | 105190109 A | * | 12/2015 | ............. B60R 17/02 |
| DE | 10251041 A1 | | 5/2004 | |

(Continued)

OTHER PUBLICATIONS

German Search Report issued in corresponding German Patent Application No. 10 2019 207 254.2 dated Mar. 9, 2020.

*Primary Examiner* — Roger L Pang
(74) *Attorney, Agent, or Firm* — Finch & Maloney PLLC

(57) ABSTRACT

A method for operating a motor vehicle that has an internal combustion engine and an automated manual transmission, connected between the engine and a drive output. The transmission includes a shifting element group with a plurality of shifting elements. The transmission further includes an oil pump and an electric machine, both of which are integrated in the transmission and coupled to an input shaft of the transmission. The oil pump delivers a flow of transmission oil for cooling the shifting element group and cooling the electric machine, and the shifting elements of the shifting element group are controlled and shifted by an actuator system that is independent of the oil pump. When the motor vehicle is at rest, the oil pump is driven by the electric machine in order to cool the electric machine while the motor vehicle is at rest.

12 Claims, 1 Drawing Sheet

(51) Int. Cl.
*B60K 5/00* (2006.01)
*B60K 23/00* (2006.01)
*B60K 17/06* (2006.01)
*B60W 10/30* (2006.01)

(52) U.S. Cl.
CPC ............ *B60W 10/08* (2013.01); *B60W 10/30* (2013.01); *F16H 57/0412* (2013.01); *B60W 2510/0208* (2013.01); *B60W 2510/087* (2013.01); *B60W 2510/1005* (2013.01); *B60W 2510/107* (2013.01); *B60W 2520/10* (2013.01); *B60W 2710/081* (2013.01)

(58) Field of Classification Search
CPC ....... B60W 2510/107; B60W 2520/10; B60W 2710/081; B60W 30/18018; F16H 57/0439; F16H 57/0412; B60K 2001/006; B60K 2025/005
See application file for complete search history.

(56) References Cited

U.S. PATENT DOCUMENTS

| | | | | |
|---|---|---|---|---|
| 9,657,831 | B2* | 5/2017 | Nefcy | ................ B60K 6/48 |
| 10,371,254 | B2 | 8/2019 | Fukui et al. | |
| 11,352,939 | B2* | 6/2022 | Oh | ................ F04B 49/065 |
| 2011/0166727 | A1* | 7/2011 | Light | ................ F16H 61/0031 |
| | | | | 701/22 |
| 2014/0349811 | A1 | 11/2014 | Ichikawa et al. | |
| 2017/0120916 | A1* | 5/2017 | Gibson | ................ F16H 61/0267 |
| 2021/0095649 | A1* | 4/2021 | Furushou | ................ F16H 57/0417 |

FOREIGN PATENT DOCUMENTS

| | | |
|---|---|---|
| DE | 60216049 T2 | 7/2007 |
| DE | 112013000340 T5 | 8/2014 |
| DE | 102017006366 A1 | 1/2018 |
| DE | 112014002977 B4 | 10/2019 |
| KR | 20120046699 A * | 5/2012 |

* cited by examiner

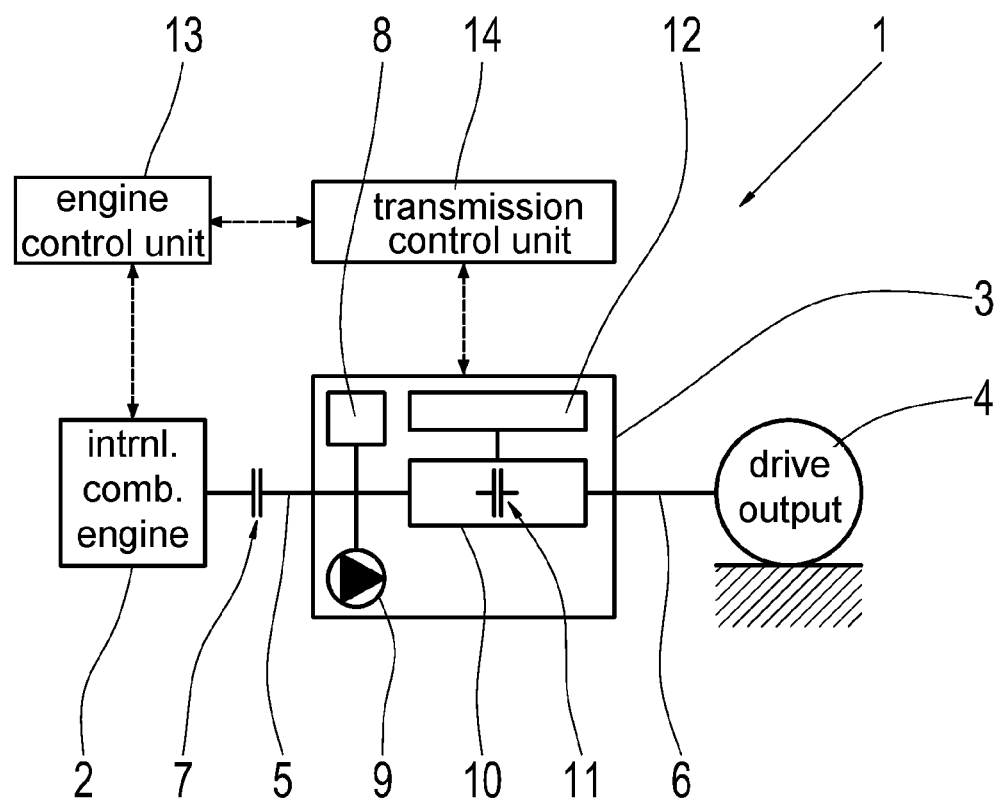

CONTROL METHOD AND CONTROL UNIT FOR A VEHICLE DRIVETRAIN

This application claims priority from German patent application serial no. 10 2019 207 254.2 filed May 17, 2019.

FIELD OF THE INVENTION

The invention relates to a method for operating a drivetrain of a motor vehicle. In addition, the invention relates to a control unit for carrying out the method.

BACKGROUND OF THE INVENTION

The invention relates to a method for operating a drivetrain having an automated manual transmission. An automated manual transmission has a shifting element group comprising a plurality of shifting elements, such that the shifting element group can be controlled by an actuator system, for example a pneumatic actuator system or an electric actuator system. Integrated in the automated manual transmission are an oil pump and an electric machine, wherein the oil pump delivers a flow of transmission oil that serves to cool and lubricate the shifting element group and to cool the electric machine. Thus, the shifting elements of the shifting element group of the automated manual transmission and the electric machine integrated in the automated manual transmission can be cooled by the transmission oil flow delivered by the oil pump.

In an automated manual transmission both the oil pump integrated in the automated manual transmission and also the electric machine integrated in the automated manual transmission are coupled to the transmission input shaft. When a motor vehicle with an automated manual transmission of this type is at rest, the oil pump is inactive and thus the electric machine cannot be cooled. If the electric machine has heated up to a relatively high temperature by intense use before the resting phase, then during the resting phase the electric machine will remain at this relatively high temperature because heat radiation alone cannot provide a sufficient cooling effect for the electric machine. This is particularly disadvantageous when after the resting phase of the electric machine, it is again required to deliver a high power. In order to avoid overheating of the electric machine, it may be necessary to reduce the power demanded from the electric machine. This is a disadvantage.

SUMMARY OF THE INVENTION

Starting from there, the object of the invention is to create a novel method for operating a drive train of a motor vehicle and a corresponding control device.

This objective is achieved by a method for operating a drive-train of a motor vehicle, according to the independent claim(s).

According to the invention, when the motor vehicle is at rest the oil pump is powered by the electric machine itself in order to cool the electric machine while the motor vehicle is at rest.

The invention proposes that with an automated manual transmission in which the oil pump and the electric machine are integrated in such manner that both of them are coupled to the transmission input shaft, when the motor vehicle is at rest the oil pump is driven by the electric machine in order to be able to cool the electric machine while the motor vehicle is at rest. In particular this can be used advantageously when, for example, the motor vehicle is stopped at a red traffic-light by virtue of an automatic stop-start function of the internal combustion engine. In such a case it is then possible to lower the temperature of the electric machine while the motor vehicle is at rest.

According to an advantageous further development, when the motor vehicle is at rest and the internal combustion engine is decoupled from the transmission input shaft, and when the transmission interrupts torque in the direction toward the drive output, and when a temperature of the electric machine is higher than a limit value, and when a temperature of the transmission oil is lower than the temperature of the electric machine, the oil pump is driven by the electric machine in order to cool the electric machine by means of the flow of transmission oil while the motor vehicle is at rest. This procedure is particularly preferred in order to lower the temperature of the electric machine while the motor vehicle is at rest.

According to an advantageous further development, the rotational speed of the electric machine for driving the oil pump is determined as a function of the temperature of the electric machine and/or as a function of the temperature of the transmission oil. In that way the rotational speed of the electric machine for driving the oil pump and hence cooling the electric machine can be determined advantageously.

Preferably, the rotational speed of the electric machine is chosen to be higher, the higher the temperature of the electric machine is and/or the lower the difference between the temperature of the electric machine and the temperature of the transmission oil is. These details too serve advantageously to determine the rotational speed of the electric machine which drives the oil pump for cooling the electric machine while the vehicle is at rest.

The control unit according to the invention is defined in the independent claim(s).

Preferred further developments emerge from the subordinate claims and from the description given below.

BRIEF DESCRIPTION OF THE DRAWING

Example embodiments of the invention, to which it is not limited, are explained in greater detail with reference to the sole drawing. The sole drawings shows a block diagram of drive-train of a motor vehicle, to clarify the invention.

DETAILED DESCRIPTION OF THE PREFERRED EMBODIMENTS

The sole FIGURE shows a schematic block diagram of a drive-train 1. The drive-train 1 comprises an internal combustion engine 2 and an automated manual transmission 3, the automated manual transmission 3 being connected between the internal combustion engine 2 and a drive output 4. The automated manual transmission 3 converts rotational speeds and torques and transmits the traction force supplied by the internal combustion engine 2 to the drive output 4.

The automated manual transmission 3 has a transmission input shaft 5 and a transmission output shaft 6. The internal combustion engine 2 can be coupled to the transmission input shaft 5 by way of a separator clutch 7.

When the separator clutch 7 is open the internal combustion engine 2 is decoupled from the transmission input shaft 5. In contrast, when the separator clutch 7 is closed the internal combustion engine 2 is coupled to the transmission input shaft 5. The transmission output shaft 6 is functionally connected with the drive output 4.

The automated manual transmission 3 comprises a shifting element group 10 consisting of a plurality of shifting elements 11, wherein the shifting elements 11 of the shifting element group 10 can be controlled by an actuator system 12 in order to shift the shifting elements 11, namely to engage or close, or disengage or open them. The actuator system 12 is preferably a pneumatic actuator system 12 but can also be an electric actuator system 12.

Integrated in the automated manual transmission 3 are on the one hand an electric machine 8 and on the other hand an oil pump 9. In this case the electric machine 8 and the oil pump 9 are integrated in the same transmission housing as the shifting element group 10. The electric machine 8 and the oil pump 9 are permanently functionally connected to the transmission input shaft 5. Thus, a transmission ratio stage can be engaged between the electric machine 8 and the transmission input shaft 5 and/or between the oil pump 9 and the transmission input shaft 5.

The sole FIGURE also shows an engine control unit 13 and a transmission control unit 14. The engine control unit 13 controls and/or regulates the operation of the internal combustion engine 2. The transmission control unit 14 controls and/or regulates the operation of the automated manual transmission 3. For that purpose the two control units 13, 14 exchange data as shown by the broken-line double arrows, on the one hand with the internal combustion engine 2 and the automated manual transmission 3 and on the other hand with one another.

As already mentioned, the electric machine 8 and the oil pump 9 are permanently coupled to the transmission input shaft 5. By means of the oil pump 9 a flow of transmission oil can be produced in order to cool and lubricate the shifting element group 10. This transmission oil flow delivered by the oil pump 9 also serves to cool the electric machine 8. Thus, the shifting element group 10 and the electric machine 8 use the same cooling circuit for cooling.

The actuator system 12 that serves to control the shifting elements 11 of the shifting element group 10 is independent of the oil pump 9. Accordingly, the transmission oil flow delivered by the oil pump 9 does not serve to shift the shifting elements in order to close or open the shifting elements. For that purpose the automated manual transmission 3 has the actuator system 12 which is independent of the oil pump 9.

The present invention proposes that when the motor vehicle is at rest the oil pump 9 is driven by the electric machine 8 in order to cool the electric machine 8 by means of the transmission oil flow produced by the oil pump 9 when the motor vehicle is at rest. If before the resting phase of the motor vehicle the electric machine 8 has been used intensively so that its temperature is relatively high, then by virtue of the invention it can be ensured that while the motor vehicle is at rest the electric machine 8 can still be cooled.

Preferably it is provided that when the motor vehicle is at rest, when the internal combustion engine 2 is decoupled from the transmission input shaft 5 because the separator clutch 7 is open, and when the manual transmission 3 interrupts torque in the direction toward the drive output 4 since in particular the transmission is in neutral, and when a temperature of the electric machine 8 is higher than a limit value, and when a temperature of the transmission oil is lower than the temperature of the electric machine 8, the oil pump 9 of the automated manual transmission 3 is driven by the electric machine 8 in order to cool the electric machine 8 by means of the transmission oil flow delivered by the oil pump 9 while the motor vehicle is at rest.

The rotational speed of the electric machine 8, with which it is then operated, is preferably determined as a function of the temperature of the electric machine 8 and/or as a function of the temperature of the transmission oil, preferably as a function of both those temperatures.

The higher the temperature of the electric machine 8, the higher a rotational speed of the electric machine 8 is chosen in order to deliver a transmission oil flow large enough to cool the electric machine 8.

Furthermore, the rotational speed of the electric machine 8 is preferably determined as a function of a difference between the temperature of the electric machine 8 and the temperature of the transmission oil. The smaller this difference is, i.e. the smaller the difference between the temperature of the electric machine 8 and the temperature of the transmission oil, the higher is the rotational speed chosen for the electric machine 8 in order to be able to draw off enough heat from the electric machine 8 into the transmission oil flow.

If in the above method it is found that the temperature of the electric machine 8 is lower than the limit value, or that the temperature of the transmission oil is higher than the temperature of the electric machine 8, then the method according to the invention is terminated. It is then no longer necessary or useful to drive the oil pump 9 by means of the electric machine 8 when the motor vehicle is at rest, since either it is no longer necessary to cool the electric machine 8 or, on account of its temperature, the transmission oil is not suitable for cooling the electric machine 8.

As already mentioned, the invention relates to an application case of a motor vehicle with an automated manual transmission 3, in which the electric machine 8 and the oil pump 9 are permanently coupled to the transmission input shaft 5, if necessary with interposition of a transmission ratio stage. The electric machine 8 and the oil pump 9 are both integrated in the manual transmission 3, wherein the electric machine 8 and the shifting elements 11 of the automated manual transmission 3 are both cooled by the flow of transmission oil delivered by the oil pump 9. This transmission oil flow does not serve to shift the shifting elements 11 but only to cool and lubricate them.

The invention is preferably used when the motor vehicle is at a red traffic light, for example using an automatic start-stop function of the internal combustion engine 2.

The invention can also be used when or after the motor vehicle has been parked, in which case while the motor vehicle is at rest and the internal combustion engine 2 is switched off, the electric machine 8 is preferably kept active for driving the oil pump 9 until the temperature of the electric machine 8 becomes lower than the limit value or than a predetermined parking temperature.

The invention further relates to a control unit for operating an automated manual transmission 3 which is designed to carry out the above-described method by control means. This control unit is preferably the transmission control unit 14. The control unit according to the invention controls the electric machine 8, which is integrated in the automated manual transmission 3, by way of a data interface in order to operate the electric machine at a defined rotational speed. When the motor vehicle is at rest, the control unit according to the invention activates the electric machine 8 to drive the oil pump 9 in order to cool the electric machine 8 while the motor vehicle is at rest, and this indeed preferably when the temperature of the electric machine 8 is higher than a limit value, when the temperature of the transmission oil is lower than the temperature of the electric machine 8, when the internal combustion engine 2 is decoupled from the transmission 3 and when the automated manual transmission 3 is in a neutral position. By way of the data interface the control unit can exchange data with other assemblies, for example with temperature sensors that detect the temperature of the transmission oil and the temperature of the electric machine. The control unit according to the invention also comprises a processor for data processing and a memory for data storage. To operate the electric machine 8 the control unit, namely its processor, determines the rotational speed of the electric machine 8 in the manner described above.

INDEXES

1 Drive-train
2 Internal combustion engine
3 Automated manual transmission
4 Drive output
5 Transmission input shaft
6 Transmission output shaft
7 Separator clutch
8 Electric machine
9 Oil pump
10 Shifting element group
11 Shifting element
12 Actuator system
13 Engine control unit
14 Transmission control unit

The invention claimed is:

1. A method of operating a motor vehicle with an internal combustion engine having an automated manual transmission connected between the internal combustion engine and a drive output, the automated manual transmission has a shifting element group with a plurality of shifting elements, the automated manual transmission further has an oil pump and an electric machine which are both integrated in the automated manual transmission and coupled to a transmission input shaft of the automated manual transmission, the method comprising:
    delivering, via the oil pump, a flow of transmission oil for cooling the shifting element group and cooling the electric machine;
    controlling and shifting the shifting elements of the shifting element group by an actuator system that is independent of the oil pump; and
    when the motor vehicle is at rest, driving the oil pump with the electric machine in order to cool the electric machine while the motor vehicle is at rest.

2. The method according to claim 1, further comprising, when the motor vehicle is at rest, driving the oil pump with the electric machine in order to cool the electric machine while the motor vehicle is at rest, and when each of:
    the internal combustion engine is decoupled from the transmission input shaft,
    the automated manual transmission interrupts torque transmission in a direction toward the drive output,
    a temperature of the electric machine is higher than a limit value, and
    a temperature of the transmission oil is lower than the temperature of the electric machine.

3. The method according to claim 2, further comprising, when the automated manual transmission is shifted to neutral, interrupting, with the automated manual transmission, the torque transmission in the direction toward the drive output.

4. The method according to claim 1, further comprising determining a rotational speed of the electric machine for driving the oil pump as a function of a temperature of the electric machine.

5. The method according to claim 4, further comprising choosing a higher rotational speed of the electric machine when the temperature of the electric machine is higher.

6. The method according to claim 1, further comprising determining a rotational speed of the electric machine for driving the oil pump as a function of a temperature of the transmission oil.

7. The method according to claim 1, further comprising determining a rotational speed of the electric machine for driving the oil pump as a function of a difference between a temperature of the electric machine and a temperature of the transmission oil.

8. The method according to claim 7, further comprising choosing a higher rotational speed of the electric machine when the difference between the temperature of the electric machine and the temperature of the transmission oil is smaller.

9. A control unit for operating an automated manual transmission, the automated manual transmission having a shifting element group with a plurality of shifting elements, the automated manual transmission having an oil pump and an electric machine which are both integrated in the automated manual transmission and are coupled to a transmission input shaft of the manual transmission, a flow of transmission oil being deliverable by the oil pump for cooling the shifting element group and cooling the electric machine, and the shifting elements of the shifting element group are controllable and shiftable by an actuator system independently of the oil pump, and, when the motor vehicle is at rest, the control unit activates the electric machine such that the electric machine drives the oil pump in order to cool the electric machine while the motor vehicle is at rest.

10. The control unit according to claim 9, wherein the control unit is designed to carry out a method for operating an automated manual transmission, on a control side, including:
    delivering, via the oil pump, the flow of transmission oil for cooling the shifting element group and cooling the electric machine;
    controlling and shifting the shifting elements of the shifting element group by an actuator system that is independent of the oil pump; and
    driving the oil pump with the electric machine when the motor vehicle is at rest in order to cool the electric machine while the motor vehicle is at rest.

11. A method for operating a motor vehicle having an internal combustion engine and an automated manual transmission that is connected between the internal combustion engine and a drive output, the automated manual transmission has a housing in which an oil pump, an electric machine and a shifting element group with a plurality of shifting elements are housed, and the automated manual transmission has an input shaft that is engagable with the internal combustion engine, and is continually functionally engaged with the oil pump and the electric machine, the method comprising;
    controlling and shifting the shifting elements of the shifting element group with an actuator system that is independent of the oil pump;
    detecting, with a control unit, standstill of the motor vehicle; and
    driving the oil pump with the electric machine to deliver a flow of transmission oil to the electric machine for cooling the electric machine when the standstill of the motor vehicle is detected.

12. The method according to claim 11, further comprising:
- detecting, with the control unit, disengagement the input shaft from the internal combustion engine, a temperature of the electric machine, a temperature of the transmission oil, and a neutral condition of the automated manual transmission; and
- driving the oil pump with the electric machine to deliver the flow of the transmission oil to the electric machine for cooling the electric machine when each of:
    - disengagement of the input shaft from the internal combustion engine is detected;
    - the temperature of the electric machine is higher than a limit value;
    - the temperature of the transmission oil is lower than the temperature of the electric machine; and
    - the neutral condition of the automated manual transmission is detected.

\* \* \* \* \*